United States Patent [19]

Hanyu et al.

[11] Patent Number: 5,557,435
[45] Date of Patent: Sep. 17, 1996

[54] LIQUID CRYSTAL DEVICE AND DISPLAY APPARATUS

[75] Inventors: Yukio Hanyu, Atsugi; Tadashi Mihara, Isehara; Yasuto Kodera, Fujisawa; Katsutoshi Nakamura, Atsugi, all of Japan

[73] Assignee: Canon Kabushiki Kaisha, Tokyo, Japan

[21] Appl. No.: 9,062

[22] Filed: Jan. 26, 1993

[30] Foreign Application Priority Data

Jan. 28, 1992 [JP] Japan ................... 4-013026

[51] Int. Cl.$^6$ ....................................... G02F 1/13
[52] U.S. Cl. ........................ 359/75; 359/100
[58] Field of Search ................ 359/75, 77, 78, 359/100, 63

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,932,758 | 6/1990 | Hanyu et al. | 359/100 |
| 5,013,137 | 5/1991 | Tsuboyama et al. | 350/333 |
| 5,046,822 | 9/1991 | Matsuda et al. | 359/77 |
| 5,109,294 | 4/1992 | Hanyu et al. | 359/83 |
| 5,186,985 | 2/1993 | Estes et al. | 428/1 |
| 5,188,870 | 2/1993 | Brosig | 359/78 |
| 5,189,536 | 2/1993 | Hanyu et al. | 359/100 |
| 5,192,596 | 3/1993 | Hanyu et al. | 428/1 |
| 5,200,848 | 4/1993 | Hanyu et al. | 359/100 |
| 5,347,381 | 9/1994 | Shinomiya | 359/78 |

FOREIGN PATENT DOCUMENTS

| | | |
|---|---|---|
| 444704 | 9/1991 | European Pat. Off. . |
| 496628 | 7/1992 | European Pat. Off. . |
| 0152878 | 3/1989 | Japan . |
| 02109658 | 4/1990 | Japan . |

OTHER PUBLICATIONS

Hiruoka et al, "Electric–Field Induce Apparent Tilt Angle and Devils Staircase," JJ of Applied Physics, vol. 30, #10A, Oct. 1991.

Koden, et al., Jap. Journal Applied Physics, vol. 30, No. 10(1991) 1823–5.

Primary Examiner—William L. Sikes
Assistant Examiner—Kenneth Parker
Attorney, Agent, or Firm—Fitzpatrick, Cella, Harper & Scinto

[57] ABSTRACT

A chiral smectic liquid crystal device is constituted by a chiral smectic liquid crystal, and a pair of substrates sandwiching the liquid crystal with their opposite surfaces that are provided with electrodes for applying a voltage to the liquid crystal and uniaxial alignment axes which are parallel or substantially parallel to each other and identical in direction. The liquid crystal device is provided with excellent bistability and freeness from "burning" if the liquid crystal is placed in the alignment state characterized in that (A) a relationship of $\alpha < ⓗ$ is satisfied, wherein $\alpha$ denotes a pretilt angle and $ⓗ$ denotes a tilt angle, respectively, of the liquid crystal and (B) the liquid crystal provides at least two stable states of optical axes which form an angle $2\theta a$ therebetween satisfying $ⓗ > \theta a > ⓗ/2$.

7 Claims, 5 Drawing Sheets

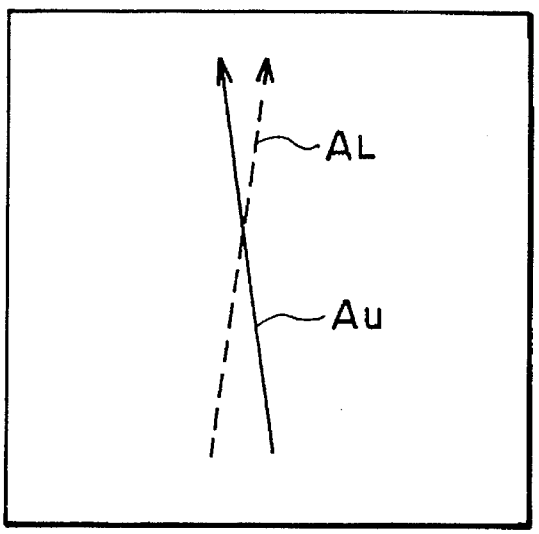
F I G. 4A
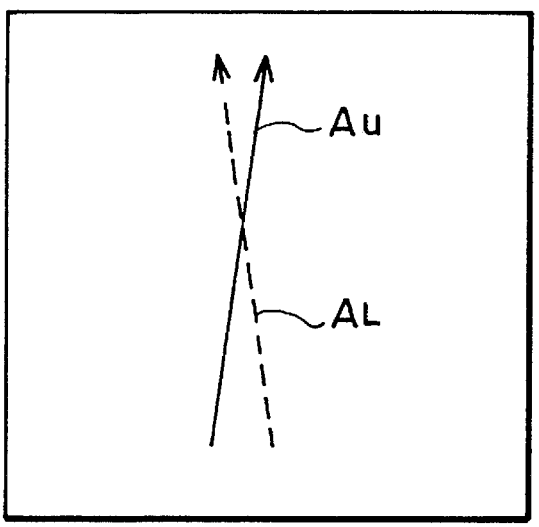
F I G. 4B

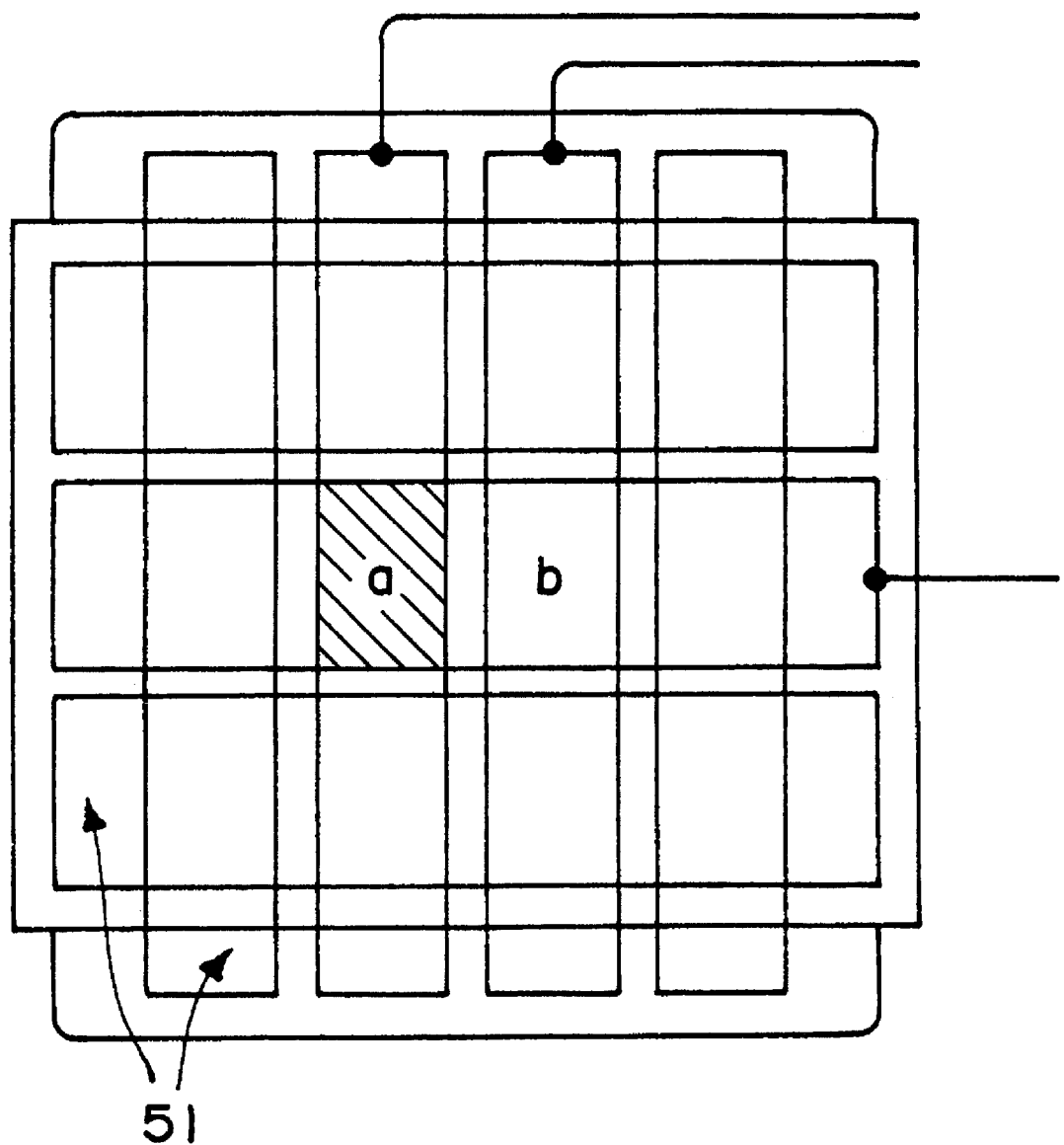
F I G. 5

LIQUID CRYSTAL DEVICE AND DISPLAY APPARATUS

FIELD OF THE INVENTION AND RELATED ART

This invention relates to a liquid crystal device to be used in a liquid crystal display device or a liquid crystal-optical shutter, etc., particularly a liquid crystal device using a ferroelectric liquid crystal, more particularly to a liquid crystal device improved in display characteristics through improvement in alignment of the liquid crystal molecules.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta a \, \sin^2(\Delta n d/\lambda)\pi,$$

wherein $I_0$: incident light intensity,
I: transmitted light intensity,
$\theta a$: apparent tilt angle,
$\Delta n$: refractive index anisotropy,
d: thickness of the liquid crystal layer,
$\lambda$: wavelength of the incident light.

The apparent tilt angle $\theta a$ in the above-mentioned non-helical structure is recognized as a half of an angle between the average molecular axis directions of liquid crystal molecules in a twisted alignment in a first orientation state and a second orientation state. According to the above equation, it is shown that an apparent tilt angle $\theta a$ of 22.5 degrees provides a maximum transmittance and the apparent tilt angle $\theta a$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, as reported in Ferroelectrics, 1988, Vol. 185, pp. 255–264, such a ferroelectric liquid crystal device in uniform alignment involves a problem that, when the device is left standing in one stable state, the state is further stabilized to deteriorate the bistability. This leads to a significant defect in a display. More specifically, there arises a problem of "burning" that, when a certain pattern is continually written or displayed for a long period, the pattern is not completely erased by rewriting but remains to some extent.

SUMMARY OF THE INVENTION

An object of the present invention is to provide a novel chiral smectic liquid crystal device having solved the above-mentioned problems, particularly the occurrence of burning.

According to the present invention, there is provided a chiral smectic liquid crystal device, comprising: a chiral smectic liquid crystal, and a pair of substrates sandwiching the liquid crystal with their opposite surfaces that are provided with electrodes for applying a voltage to the liquid crystal and uniaxial alignment axes which are parallel or substantially parallel to each other and identical in direction, wherein the liquid crystal is placed in an improved alignment state characterized in that:

(A) a relationship of $\alpha > \textcircled{H}$ is satisfied, wherein a denotes a pretilt angle and $\textcircled{H}$ denotes a tilt angle, respectively, of the liquid crystal; and (B) any one of the following conditions (i)–(iii) is satisfied:

(i) the liquid crystal provides at least two stable states of optical axes which form an angle $2\theta a$ therebetween satisfying $\textcircled{H} > \theta a > \textcircled{H}/2$, (ii) the liquid crystal provides at least two stable states of optical axes forming an angle therebetween such that, when the liquid crystal device is sandwiched between a pair of a first polarizer and a second polarizer so that the first polarizer is disposed to have its absorption axis dividing the angle into equal halves and the second polarizer is disposed to have its absorption axis perpendicular to the absorption axis of the first polarizer in a basic position, a clockwise rotation from the basic position of only the first polarizer provides a color which is identical to a color provided by a counter-clockwise rotation from the basic position of only the first polarizer, and (iii) the liquid crystal provides three of four stable states including two stable states having an extinction position showing a low transmittance and one or two stable states having an extinction position showing a relatively high transmittance, respectively when sandwiched between cross nicol polarizers.

It is preferred that the uniaxial alignment axes provided to the pair of substrates cross each other at a crossing angle $\theta c$ satisfying: $0 < \theta c \leq \pm 15$ degrees. It is further preferred that a lower substrate of the pair is provided with a uniaxial alignment axis which is deviated in a clockwise direction when the liquid crystal has a negative spontaneous polarization or deviated in a counterclockwise direction when the liquid crystal has a positive spontaneous polarization, respectively, with respect to a uniaxial alignment axis provided to an upper substrate of the pair as viewed from above.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 4A and 4B are schematic plan views for illustrating a relationship between rubbing directions provided to a pair of substrate.

FIG. 5 is a view for illustrating a method of evaluating "burning".

DESCRIPTION OF THE PREFERRED EMBODIMENTS

Figure 1:
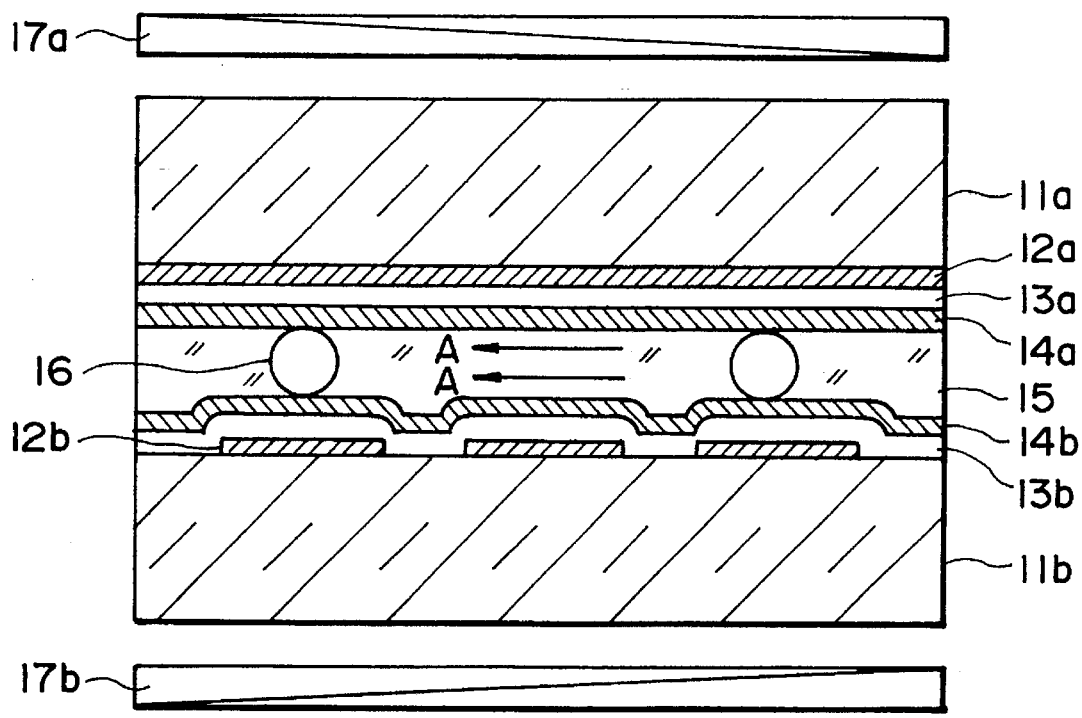
FIG. 1 is a sectional view of an embodiment of the liquid crystal device usable in the invention.

FIG. 1 is a schematic sectional view of an embodiment of the ferroelectric liquid crystal device according to the present invention.

Referring to FIG. 1, the device includes substrates (glass plates) $11a$ and $11b$ coated with transparent electrodes $12a$ and $12b$, respectively, of, e.g., $In_2O_3$ or ITO (indium tin oxide) and then with 200 to 3000 Å-thick insulating films $13a$ and $13b$ (of, e.g., $SiO_2$, $TiO_2$ or $Ta_2O_5$) and with 50 to 1000 Å-thick alignment films $14a$ and $14b$, respectively of a polyimide as described above. The alignment films $14a$ and $14b$ have been rubbed in directions A which are parallel and in the same direction. Between the substrates $11a$ and $11b$ is disposed a ferroelectric chiral smectic liquid crystal 15. The spacing between the substrates $11a$ and $11b$ is set to a small value (e.g., 0.1–3 μm) sufficient to suppress the formation of a helical structure of the chiral smectic liquid crystal so that the chiral smectic liquid crystal 15 is placed in a bistable alignment state. The sufficiently small spacing for the liquid crystal 15 is held by spacer beads 16 (of e.g., silica or alumina) disposed between the alignment films $14a$ and $14b$. The entire cell is sandwiched between polarizers $17a$ and $17b$.

With such a structure of ferroelectric liquid crystal device, we have obtained a liquid crystal device in uniform alignment wherein the difference in threshold value between a first stable state and a second stable state is very small even after being left standing for a long period in either one of the first and second stable orientation states by using a specific combination of an alignment film, an alignment method and a liquid crystal.

More specifically, in a ferroelectric liquid crystal device comprising a chiral smectic liquid crystal, and a pair of substrates sandwiching the liquid crystal with their opposite surfaces that are provided with electrodes for applying a voltage to the liquid crystal and uniaxial alignment axes which are parallel or substantially parallel to each other and identical in direction, we have discovered it possible to obtain a liquid crystal device in uniform alignment wherein the difference in threshold value between a first stable state and a second stable state is very small even after being left standing for a long period in either one of the first and second stable orientation states, if the liquid crystal is placed in an alignment state satisfying $\alpha > \textcircled{H}$, wherein $\alpha$ denotes a pretilt angle and $\textcircled{H}$ denotes a tilt angle (a half of cone angle), respectively, of the liquid crystal. The alignment state developed in the present invention will be described further.

Figure 2A:
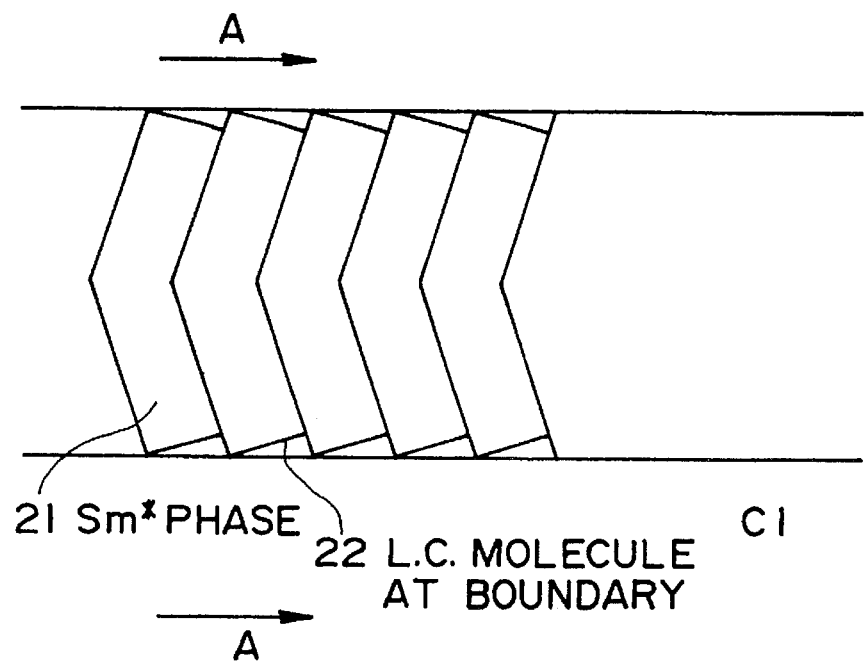
FIGS. 2A and 2B are schematic sectional views of a liquid crystal device illustrating two types of alignment in chevron structure.
Figure 2B:
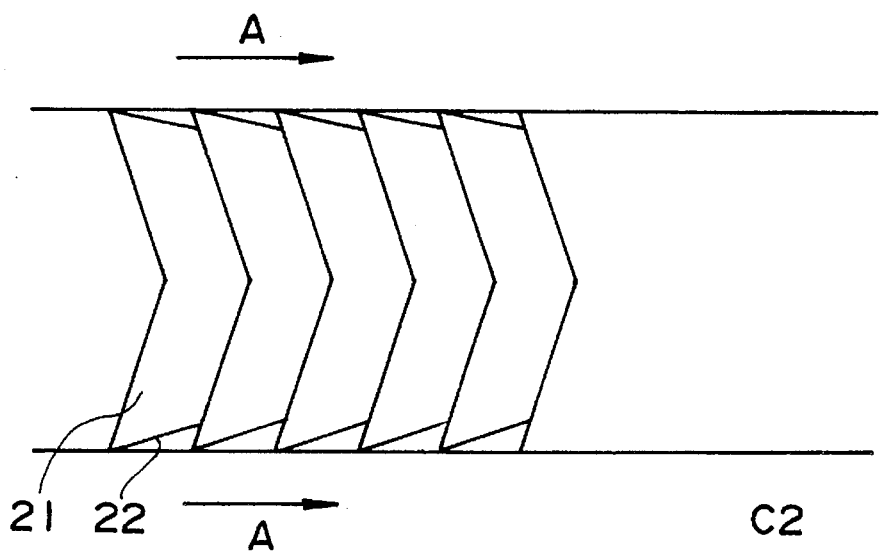

A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates and (chevron structure) as shown in FIG. 2, wherein reference numeral 21 denotes a smectic layer showing ferroelectricity and 22 denotes a liquid crystal molecule denotes at the substrate boundary. The bending of the layers can be caused in two ways corresponding to C1 and C2 alignments as shown. As is well known, liquid crystal molecules at the substrate surfaces are aligned to form a certain angle $\alpha$ (pre-tilt) as a result of rubbing in a direction A in such a manner that their heads (leading ends) in the rubbing direction are up (or away) from the substrate surfaces. In the device of the present invention, it is believed that the liquid crystal assumes C1 alignment.

Figure 3:
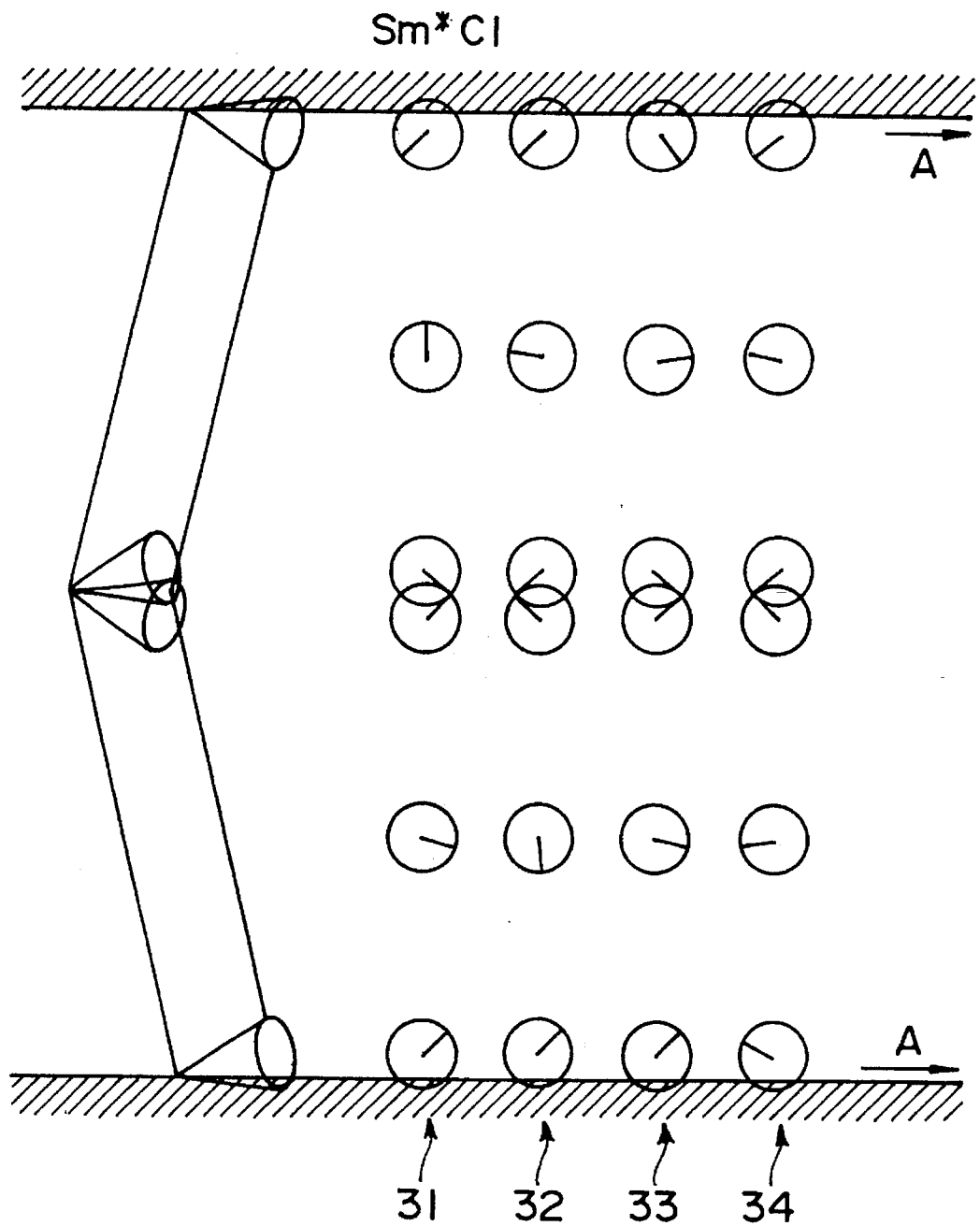
FIG. 3 is a schematic sectional view illustrating C1 alignment.

FIG. 3 is a schematic view illustrating director positions between the substrates in the respective states in C1 alignment. More specifically, at 31–34 are respectively shown changes in director positions between the substrates in the form of projections of directors onto cone bottoms as viewed from each bottom. At 31 and 32 is shown a splay state, and at 33 and 34 is shown a director arrangement which is believed to represent a uniform alignment state. As is understood from FIG. 3, at 33 and 34 representing a uniform state, the molecule position (director) is different from that in the splay state either at the upper substrate or lower substrate.

Next, a preferred relationship between the alignment state in the present invention and a crossing angle $\theta c$ or $\theta_{cross}$ between rubbing directions provided to a pair of substrates will be described. In the present invention, an alignment control layer providing a pretilt angle a which is larger than a tilt angle $\textcircled{H}$. In the course of increasing the pretilt angle to approach and exceed $\textcircled{H}$, a twist alignment shown at 31 and 32 in FIG. 3 appears. In order to suppress the twist alignment 31 and 32 and make a uniform alignment as shown at 33 and 34 in FIG. 3, it is advantageous to have the rubbing directions deviate from each other at an angle of several degrees, preferably 3–30 degrees, further preferably 3–15 degrees. It is further preferred that the deviation is provided in a particular direction in relation with the polarity of spontaneous polarization of the FLC used. More specifically, in case where the FLC has a spontaneous polarization Ps<0, it is preferred that a lower substrate is provided with a uniaxial alignment axis $A_L$ which is deviated in a clockwise direction from a uniaxial alignment axis $A_U$ provided to an upper substrate of the pair as viewed from above as shown in FIG. 4A. On the other hand, in case where the FLC has a spontaneous polarization Ps>0, it is preferred that a lower substrate is a uniaxial alignment axis $A_L$ which is deviated in a counterclockwise direction from a uniaxial alignment axis $A_U$ provided to an upper substrate of the pair as viewed from above as shown in FIG. 4B.

The parameters characterizing the present invention were measured according to the following methods.
Measurement of Tilt Angle $\textcircled{H}$ A FLC (ferroelectric liquid crystal) device was sandwiched between right-angle-cross nicol polarizers and rotated horizontally relative to the polarizers under application of a DC voltage of 10–30 volts between the upper and lower substrates to find a first extinction position (a position providing the lowest transmittance), and then a DC voltage of a polarity opposite to the above DC voltage is applied between the substrates to find a second extinction position. A tilt angle (H) was measured as a half of the angle between the first and second extinction positions.

Measurement of Apparent Tilt Angle θa

An FLC device sandwiched between right angle cross nicol polarizers was supplied with a single pulse of one polarity exceeding the threshold voltage of the ferroelectric liquid crystal and was then rotated under no electric field horizontally relative to the polarizers to find a first extinction position. Then, the FLC device was supplied with a single pulse of the opposite polarity exceeding the threshold voltage of the ferroelectric liquid crystal and was then rotated under no electric field relative to the polarizers to find a second extinction position. An apparent tilt angle θa was measured as a half of the angle between the first and second extinction positions.

Measurement of Pretilt Angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture (A) assuming SmA phase in the temperature range of 0°–60° C. For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

Measurement of Burning

As shown in FIG. 5, a pair of substrates were respectively provided with stripe electrodes and were applied to each other so as to form a pixel at each intersection, followed by filling with a liquid crystal, to form a matrix display panel. The threshold values of panel were measured by applying rectangular wave voltages.

In the initial stage, a threshold value from a stale state A to a stable state B and also a reverse threshold value from the stable state B to the stage state A were measured to confirm bistability. Then, pixels in regions a and b were oriented or switched to the stable state A and the stable state B, respectively, and then left standing for 3 days at 30° C. then, the threshold values of the switching in two directions were measured for the pixels in the regions a and b, respectively, so as to evaluate a deviation between the threshold values in two directions (i.e., A to B and B to A).

hereinbelow, some examples of a liquid crystal cell preparation according to the present invention will be described.

EXAMPLE 1

A glass plate provided with transparent electrodes were coated with a film of tantalum oxide by sputtering and then with a 1%-NMP (N-methylpyrrolidone solution) of polyamide acid ("LQ 1802", available from Hitachi Kasei K.K.) by using a spinner, followed by baking at 270° C. for 1 hour and rubbing under the conditions of rubbing roller pressing of 0.3 μ, roller rotation speed of 1000 rpm and roller moving rate of 30 mm/sec). The substrate thus treated as the upper substrate and a lower substrate treated in the same manner were applied to each other with a spacing of 1.5 μm therebetween so that the rubbing axis provided to the lower substrate was twisted by 6 degrees from the rubbing axis provided to the upper substrate as viewed from above. The thus-formed cell showed a pretilt angle α of 18 degrees as measured by the crystal rotation method. The cell was filled with a mixture ferroelectric liquid crystal containing a phenylpyrimidine as a principal component and showing a tilt angle of 14 degrees at 30° C., a Ps of −5 nC/cm² and showing the following phase transition series:

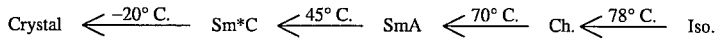

Crystal ⇌ −20° C. ⇌ Sm*C ⇌ 45° C. ⇌ SmA ⇌ 70° C. ⇌ Ch. ⇌ 78° C. ⇌ Iso.

The resultant liquid crystal cell was aged at 100° C. for 3 hours and then observed through a polarizing microscope while being gradually cooled, whereby C1 alignment was retained over the entire Sm*C range and the apparent tilt angle was measured to be 12 degrees. Then, the cell in uniform state was evaluated with respect to display characteristics in the following manner.

The liquid crystal cell was sandwiched between a pair of right-angle cross-nicol polarizers, supplied with a pulse of 30 volts and 50 μsec and then the cross-nicol polarizers were rotated to provide an extinction position (darkest state), where the transmittance was measured to be 0.2% by a photomultiplier. Then, the cell was supplied with a pulse of −30 volts and 50 μsec to provide a bright state, where the transmittance was measured to be 10 %, thus providing a contrast ratio of 50:1.

Then, the cell was placed in a state as shown in FIG. 5, i.e., pixels in the region a were oriented to a first stable state A and pixels in the region b were oriented to a second stable state B, and then left standing for three days at 30° C. Then, the threshold values of switching in two directions were measured with respect to the regions a and b respectively, whereby the results as shown in the following Table 1 were obtained.

TABLE 1

|  | Threshold voltage | |
|---|---|---|
|  | A → B | B → A |
| Region a | 10 V | 10 V |
| Region b | 10 V | 10 V |

As shown in the above Table, no deviation in threshold voltage was observed and complete bistability was retained even after three days of standing.

EXAMPLES 2–6

Several cells were prepared and evaluated in the same manner as in Example 1 except that the rubbing condition, (rubbing roller moving speed), crossing angle θc between rubbing directions provided to a pair of substrates, and Ps and tilt angle Ⓗ of the liquid crystal (thus, liquid crystal material) were respectively changed as shown in the following Table 2. The results are also shown in Table 2.

TABLE 2

| Ex. | Rubbing condition | θc | θ | Pretilt angle | Region | Threshold voltage A → B | B → A |
| --- | --- | --- | --- | --- | --- | --- | --- |
| 2 | 15 (mm/s) | −6° | 13° | 16° | a | 8.5 (V) | 8.4 (V) |
|   | (Ps = −5) |   |   |   | b | 8.4 | 8.5 |
| 3 | 10 | −6° | 13° | 14° | a | 14.1 | 13.8 |
|   | (Ps = −3) |   |   |   | b | 13.8 | 14.0 |
| 4 | 10 | −6° | 12° | 14° | a | 20 | 20 |
|   | (Ps = −1.5) |   |   |   | b | 19.8 | 20 |
| 5 | 30 | −10° | 14° | 18° | a | 10.1 | 10.1 |
|   | (Ps = −5) |   |   |   | b | 10.1 | 10.2 |
| 6 | 15 | +6° | 13° | 16° | a | 9.8 | 9.9 |
|   | (Ps = +5) |   |   |   | b | 9.8 | 9.7 |

As shown in Table 2, substantially no deviation threshold value was observed in Examples 2–6.

Comparative Examples 1–5

Several cells were prepared and evaluated in the same manner as in Example 1 except that the rubbing condition (rubbing roller moving speed), crossing angle θc between rubbing directions provided to a pair of substrates, and Ps and tilt angle Ⓗ of the liquid crystal (thus, liquid crystal material) were respectively changed as shown in the following Table 3. The results are also shown in Table 3.

TABLE 3

| Comp. Ex. | Rubbing condition | θc | θ | Pretilt angle | Region | Threshold voltage A → B | B → A |
| --- | --- | --- | --- | --- | --- | --- | --- |
| 1 | 10 (mm/s) | −6° | 14° | 14° | a | 11 (V) | 8.5 (V) |
|   | (Ps = −5) |   |   |   | b | 8.8 | 11.5 |
| 2 | 15 | −6° | 16° | 16° | a | 14 | 11.1 |
|   | (Ps = −4) |   |   |   | b | 11.0 | 13.5 |
| 3 | 30 | −16° | 14° | 18° | a | 10.8 | 9.0 |
|   | (Ps = −5) |   |   |   | b | 9.1 | 10.8 |
| 4 | 8 | −10° | 14° | 12° | a | 13 | 6 |
|   | (Ps = −5) |   |   |   | b | 6.5 | 13.5 |
| 5 | 15 | +6° | 14° | 16° | a |   | **1 |
|   | (Ps = −4) |   |   |   | b |   | **2 |

**1: Not switched to the state B.
**2: Not switched to the state A.

As described above, according to the present invention, there is provided a ferroelectric liquid crystal device which is excellent in bistability, free from deviation in threshold value and excellent in preventing "burning".

What is claimed is:

1. A chiral smectic liquid crystal device comprising: a chiral smectic liquid crystal, and a pair of substrates sandwiching the liquid crystal, said pair of substrates having opposite surfaces that are provided with electrodes for applying a voltage to the liquid crystal and uniaxial alignment axes which cross each other at a crossing angle $\Theta_c$ satisfying: $0 < /\Theta_c/ < 15$ degrees, wherein the liquid crystal is placed in the alignment state satisfying $\alpha > $ Ⓗ (wherein $\alpha$ denotes a pretilt angle and Ⓗ denotes a tilt angle, respectively, of the liquid crystal) and providing at least two stable states of optical axes which form an angle $2\Theta a$ therebetween satisfying Ⓗ $> \Theta a > $ Ⓗ$/2$, and wherein a lower substrate of the pair is provided with a uniaxial alignment axis which deviates in a clockwise direction when the liquid crystal has a negative spontaneous polarization and deviates in a counterclockwise direction when the liquid crystal has a positive spontaneous polarization with respect to a uniaxial alignment axis provided to an upper substrate of the pair as viewed from above.

2. A device according to claim 1, wherein the liquid crystal shows said alignment state over an entire temperature range of from $(T_1-5)$ °C. to $(T_1-10)$ °C., wherein $T_1$ denotes an SmA→Sm*C phase transition temperature of the liquid crystal.

3. A device according to claim 1, wherein the liquid crystal shows said alignment state over an entire temperature range of from $(T_1-5)$ °C. to $(T_1-20)$ °C., wherein $T_1$ denotes an SmA→Sm*C phase transition temperature of the liquid crystal.

4. A device according to claim 1, wherein the liquid crystal shows said alignment state over an entire temperature range of from ($T_1$-5) °C. to ($T_1$-30) °C., wherein $T_1$ denotes an SmA→Sm*C phase transition temperature of the liquid crystal.

5. A device according to claim 1, wherein the liquid crystal shows said alignment state over an entire temperature range of from ($T_1$-5) °C. to ($T_1$-40) °C., wherein $T_1$ denotes an SmA→Sm*C phase transition temperature of the liquid crystal.

6. A device according to claim 1, wherein the uniaxial alignment axes have been provided by rubbing.

7. A device according to claim 1, wherein the uniaxial alignment axes cross each other at an angle of 3–15 degrees.

* * * * *

UNITED STATES PATENT AND TRADEMARK OFFICE
CERTIFICATE OF CORRECTION

PATENT NO. : 5,557,435
DATED      : September 17, 1996
INVENTOR(S): YUKIO HANYU ET AL.

It is certified that error appears in the above-identified patent and that said Letters Patent is hereby corrected as shown below:

Title page,
AT [56] REFERENCES CITED

Foreign Patent Documents,
"0152878" should read --1-52878--.
"02109658" should read --2-109658--.

Other Publications,
""Electric-Field Induce" should read
--"Electric-Field-Induced--.

Title page,
AT [57] ABSTRACT

Line 10, "a denotes" should read --$\alpha$ denotes--.

COLUMN 1

Line 18, "of" should read --or--.

COLUMN 2

Line 20, ".above-mentioned" should read
--above-mentioned--.
Line 32, "a denotes" should read --$\alpha$ denotes--.

COLUMN 3

Line 20, "substrate." should read --substrates.--.

COLUMN 4

Line 15, "denotes" should be deleted.
Line 40, "angle a" should read --angle $\alpha$--.

UNITED STATES PATENT AND TRADEMARK OFFICE
CERTIFICATE OF CORRECTION

PATENT NO. : 5,557,435
DATED : September 17, 1996
INVENTOR(S) : YUKIO HANYU ET AL.

It is certified that error appears in the above-identified patent and that said Letters Patent is hereby corrected as shown below:

<u>COLUMN 5</u>

Line 46, ".was" should read --was--.
    Line 63, "stale" should read --stable--.

<u>COLUMN 6</u>

Line 1, "then," should read --Then,--.
    Line 6, "hereinbelow," should read --Hereinbelow,--.

Signed and Sealed this

Eleventh Day of February, 1997

Attest:

BRUCE LEHMAN

Attesting Officer     Commissioner of Patents and Trademarks